United States Patent
McGahee

[11] 3,921,589
[45] Nov. 25, 1975

[54] ANIMAL TETHERING APPARATUS

[75] Inventor: Welbourne D. McGahee, Melbourne, Fla.

[73] Assignee: Loop-A-Line, Inc., Melbourne, Fla.

[22] Filed: Oct. 30, 1972

[21] Appl. No.: 302,218

[52] U.S. Cl. ............................... 119/121; 119/117
[51] Int. Cl.² .......................................... A01K 3/00
[58] Field of Search ........................... 119/117, 121

[56] References Cited
UNITED STATES PATENTS

| | | | |
|---|---|---|---|
| 2,502,807 | 4/1950 | Temmer | 119/121 |
| 2,551,540 | 5/1951 | Johnson | 119/121 |
| 2,941,504 | 6/1960 | Supowitz | 119/121 X |
| 3,703,160 | 11/1972 | Biddle | 119/121 |

*Primary Examiner*—Louis G. Mancene
*Assistant Examiner*—Peter K. Skiff
*Attorney, Agent, or Firm*—Warren E. Ray

[57] ABSTRACT

An animal tethering device having a movable clevis on a rod with a retaining knob on the top thereof and supported by a spacer on a disc, the device further having separable threaded rods, one with a pointed end for insertion into the ground, whereby an animal may be tethered to the clevis with a line having a bight without the tieing or untieing of knots. The disc may be one element or be divided into two parts. The device may be assembled with threaded elements or it may be welded together.

12 Claims, 9 Drawing Figures

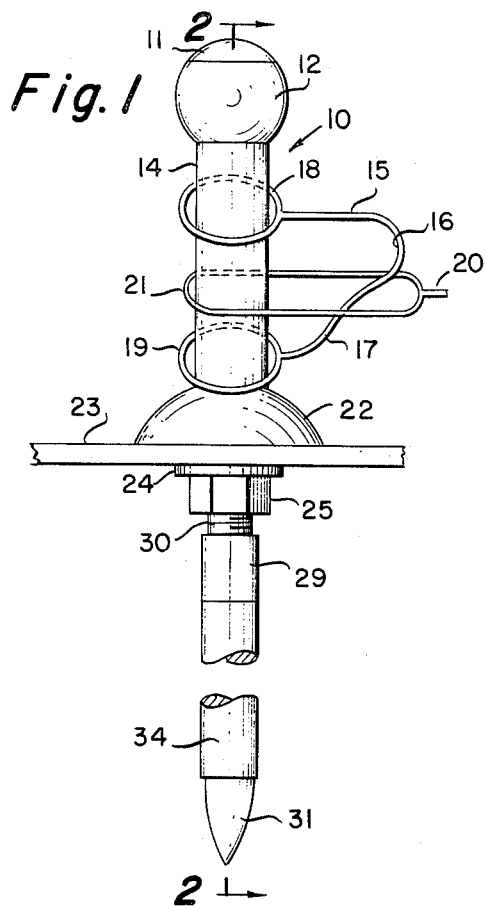
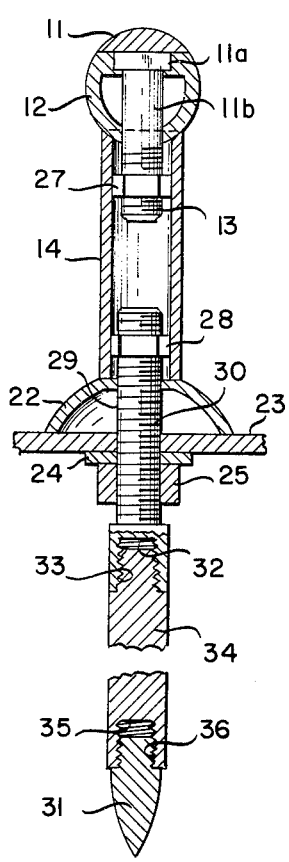
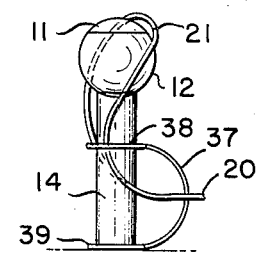
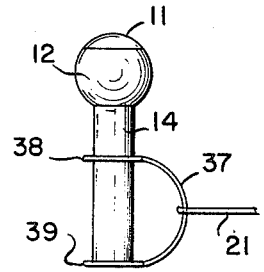
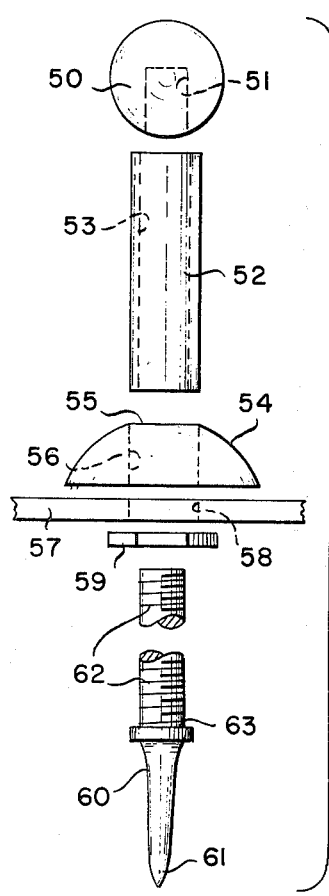
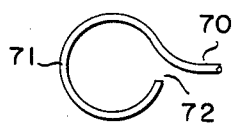
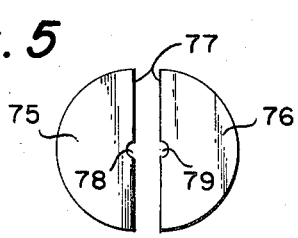
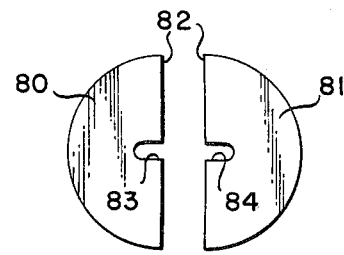
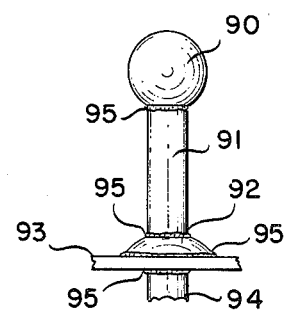

ANIMAL TETHERING APPARATUS

CROSS-REFERENCE TO RELATED APPLICATIONS

The basic concept of this invention is disclosed in an appliation entitled LINE-POST COUPLINGS AND MARINE MOORING-TOWING DEVICES, Ser. No. 296,107, filed on Oct. 10, 1972.

BRIEF SUMMARY OF THE INVENTION

Taken with the ABSTRACT this invention provides a device whereby an animal, large or small, may be tethered and untethered without tieing or untieing knots and wherein the animal may circle the device without winding the line around the ground rod. The height may be extended for larger animals by the insertion of threaded lengths or sections similar to a rifle cleaning rod. The parts may be assembled or disassembled with threaded elements or be made integral as by welding. The circular disc may consist of two slotted halves requiring less storage space when the device is not in use. The movable clevis is provided with eyes with sufficient space between the eyes and the upper rod for passage of the bight of the tethering line.

The invention in the foregoing aspects and in other subsidiary or related aspects will be fully apprehended from the following detailed description of preferred embodiments, taken in conjunction with the appended drawing, in which:

BRIEF DESCRIPTION OF THE SEVERAL VIEWS OF THE DRAWING

FIG. 1 shows an animal tethering device with initial placement of a line;

FIG. 2 is a cross section of FIG. 1 along the line 2—2;

FIG. 3 indicates the method of connecting the line and a modified clevis;

FIG. 4 depicts the line in place for tethering;

FIG. 5 is an exploded view of another tethering device;

FIG. 6 discloses a modified eye of the clevis;

FIG. 7 shows a modified plate or disc;

FIG. 8 is another modified plate or disc; and

FIG. 9 illustrates an all-welded modification of the tethering device. Similar reference numerals are applied to similar elements throughout the drawing.

DETAILED DESCRIPTION

FIG. 1, wherein numeral 10 generally indicates a tethering device, and FIG. 2, a cross-sectional view of FIG. 1 on the line 2—2, disclose a first embodiment of the animal tethering device. In these figures a hollow tubular member 14 having nuts 27, 28 fixed therein stands on an upstanding spacer 22 which in turn rides on a metal or plastic disc 23. The diameter of disc 23 may be 10 inches or so for a medium sized animal, less for a small animal and more for a large animal. It will be understood that the spacer member 22, while desirable, may be omitted. A bolt 11b is provided with a square portion 11a that fits into a like hole in the hollow, flattened, spherical-like knob 12 and with a round head 11 that cooperates with the knob 12 to present a smooth surface. The bolt 11b is provided with threads 13 that mate with the fixed nut 27 to retain the knob on the tubular member 14. An upper rod 29 with threads 30 cooperate with the nut 28, washer 24, and nut 25 to retain the assembly rigid while in use. The lower part of upper rod 29 has a bore 32 with internal threads 33 to receive an externally threaded rod 34 which in turn is provided with a bore 35 with internal threads 36 to receive further similar rods including a final rod 31 with a pointed end to facilitate insertion of the device into the ground or lawn of the animal owner. For small animals the rods may be short so that when inserted into the lawn the disc 23 may be flush with the lawn surface. In FIG. 1 a clevis member having eyes 18, 19 with sufficient diameter to provide space between the eyes and the tubular member 14 to pass a line is provided with an upper portion 15, a reduced portion 16 to receive the line bight 21 when taut, and a lower clevis portion 17. The clevis is movable upward and downward on the tubular member 14 and may move around the tubular member 14 in either direction with the movements of the tethered animal, for example, a dog.

In tethering the animal the bight 21 of a line 20 is placed in the position shown in FIG. 1. The line bight 21 is then passed upward between the clevis eye 18 and the tubular member 14 and up over the knob 12 as shown in FIG. 3. A pull on the line 20 will then place the line bight 21 in the position as shown in FIG. 4. A clevis as shown in FIG. 1 will insure that the line rides high over the disc 23 when the animal is moving around the tethering device. To untether the animal this procedure is merely reversed. The procedure for tethering and untethering the animal is the same in all embodiments. It will be noted that the tieing and untieing of knots is not required, an important feature of the invention. The animal owner, however, may tie the line to the clevis if he so desires. In all embodiments except FIG. 9 the knob may be removed in case the animal owner forgets how to disengage the line bight.

In FIGS. 3 and 4 the tubular member 14 with knob 12 and bolt head 11 is the same as in FIGS. 1 and 2. The clevis 37 with eyes 38, 39 encircling the tubular member 14 is modified by the omission of the reduced portion 16. The clevis is movable up and down on the tubular member 14 and, like the clevis in FIG. 1 may rotate around the tubular member 14 with movements of a tethered animal. The space between the clevis eyes and the tubular member 14 is sufficient to pass the line bight 21 of line 20.

The exploded view of a modification is shown in FIG. 5 wherein hollow tubular member 52 with internal surface 53 is situated beneath a bored spherical-like knob 50 with internal threads 51. The tubular member 52 rests on a hollow upstanding spacer 54 with a bore 56 and a flattened portion 55. These elements together with disc 57 with hole 58 are held together when assembled by a rod 60 having threads 62, a shoulder 63, and a pointed end 61 when mated with a nut 59 with the threaded end of the rod 60 screwed into the threads 51 of knob 50. The clevis of FIGS. 1 or 3 is used with this embodiment.

Instead of the clevis eyes being integral with the clevis shown in FIGS. 1, 3, and 4 there may be a small space 72 between the end of clevis ring 71 and clevis portion 70 as indicated in FIG. 6 for ease in manufacture. The space 72 is exaggerated in FIG. 6, and it will be understood that space 72 is too small to pass line bight 21.

Modifications of the disc 23 in FIG. 1 or disc 57 in FIG. 5 are shown in FIGS. 7 and 8. In FIG. 7, the disc is divided into two halves 75, 76, with inside diametral edges 77 provided with cutouts 78, 79. In FIG. 8 the disc has been divided into two parts 80, 81 each a little more than half of a circle with inside diametral edges 82 provided with deepened central cutouts 83, 84. The disc halves 75, 76 are held against the spacer 22 in FIG. 1 or spacer 54 in FIG. 5 with the nut 25 or nut 59. The disc parts 80, 81 in FIG. 8 are held together with the assembly in the same manner except that they are overlapped. The purpose of all of the discs is to provide a rest for the line 20 for preventing the windup of the line around the rod below the disc when the line is not taut. This feature also permits the clevis to rotate around the tubular member 14 in FIg. 1 or 52 in FIG. 5 so that the tethered animal always has a full line.

The tethering device in FIGS. 1–8 permits rapid assembly and disassembly for easy storage, but the modification in FIG. 9 shows an all-welded modification wherein the hollow or solid tubular member 91 is welded to a spherical-like knob 90 and to a spacer 92 by welds 95. The rod 94 is welded to a disc 93 which is in turn welded to spacer 92 by further welds 95. This is an economy model of the tethering device without the easy assembly feature and wherein it is not necessary to change the length of the ground rod with insertable sections as shown in FIGS. 1, 2, and 5.

There have been disclosed several animal tethering devices, integral or consisting of easily assembled members, having a movable clevis element permitting a tethered animal to move in a circle without winding up the line wherein the line may be engaged or disengaged with the clevis without tieing or untieing knots.

It will be apparent that the embodiments shown are only exemplary and that various modifications can be made in construction and arrangement within the scope of my invention as defined in the appended claims.

I claim:

1. An animal tethering device comprising a tubular rod, a knob on top of said tubular rod, a disc means, a spacer member between said disc means and said tubular rod, a ground rod means for insertion into the earth, means holding said tubular rod, knob, disc means, ground rod means, and spacer member together, a clevis member for receiving an animal tethering line, a pair of spaced eyes on said clevis member encircling said tubular rod with sufficient space between said eyes and said tubular rod to pass the bight of an animal tethering line whereby said clevis member is rotatable around and up and down on said tubular member.

2. An animal tethering device according to claim 1 wherein said clevis member has a reduced portion to receive the bight of the animal tethering line.

3. An animal tethering device according to claim 1 wherein said tubular rod is hollow and said means holding said hollow tubular rod, knob, disc means, ground rod means, and spacer member together comprises a pair of spaced nuts fixed inside said hollow tubular rod, a threaded bolt having a rounded head cooperating with said knob to prevent a rounded surface and screwed into the upper of said nuts and wherein said ground rod means is threaded and mated with the lower of said pair of nuts in said hollow tubular rod.

4. An animal tethering device according to claim 1 wherein said ground rod means comprises a plurality of sections with the lower section pointed for insertion into the ground.

5. An animal tethering device according to claim 3 wherein said means holding said hollow tubular rod, knob, disc means, ground rod means, and spacer member together further comprises a nut on said threaded ground rod means adjacent to and below said disc means.

6. An animal tethering device according to claim 1 wherein said tubular rod is hollow, said knob is provided with a threaded bore, and said means holding said hollow tubular rod, threaded knob, spacer member, and disc means comprises threads on said ground rod means projecting through said disc means, said spacer member, and said hollow tubular rod and mated with said knob threaded bore.

7. An animal tethering device according to claim 6 wherein said holding means further comprises a nut on said ground rod means below said disc means.

8. An animal tethering device according to claim 1 wherein said pair of spaced eyes on said clevis member encircling said tubular rod has a small space between the ends of said eyes and said clevis member.

9. An animal tethering device according to claim 1 wherein said disc means comprises two halves with central cutouts cooperating with said ground rod means and said spacer member.

10. An animal tethering device according to claim 1 wherein said disc means comprises two halves with extended diametral edges provided with extended cutouts which overlap and cooperate with said ground rod means and said spacer member.

11. An animal tethering device according to claim 1 wherein said means holding said tubular rod, knob, disc means, ground rod means, and spacer member together are welds.

12. An animal tethering device comprising a tubular rod, a knob on top of said tubular rod, a disc means, a ground rod means for insertion into the earth, means holding said tubular rod, knob, disc means, and ground rod means together, a clevis member for receiving an animal tethering line, a pair of spaced eyes on said clevis member encircling said tubular rod with sufficient space between said eyes and said tubular rod to pass the bight of an animal tethering line whereby said clevis member is rotatable around and up and down on said tubular member.

* * * * *

UNITED STATES PATENT OFFICE
CERTIFICATE OF CORRECTION

Patent No. 3,921,589      Dated November 25, 1975

Inventor(s) Welbourne D. McGahee

It is certified that error appears in the above-identified patent and that said Letters Patent are hereby corrected as shown below:

Column 4, line 2, "prevent" should read -- present --.

Signed and Sealed this twenty-fourth Day of February 1976

[SEAL]

Attest:

RUTH C. MASON
*Attesting Officer*

C. MARSHALL DANN
*Commissioner of Patents and Trademarks*